United States Patent [19]

Helmbold et al.

[11] Patent Number: 5,497,450
[45] Date of Patent: Mar. 5, 1996

[54] UNIVERSAL CONTROLLER INTERFACE FOR BARCODE PRINTERS

[75] Inventors: James E. Helmbold, Centerville, Ohio; David N. Long, Cheshire; David W. Riley, Easton, both of Conn.; Mitchell G. Stern, Centerville, Ohio

[73] Assignee: Monarch Marking Systems, Inc., Dayton, Ohio

[21] Appl. No.: 178,891

[22] Filed: Jan. 7, 1994

[51] Int. Cl.⁶ .............................. G06K 15/00; G06F 7/00
[52] U.S. Cl. ............................ 395/114; 395/112; 395/101
[58] Field of Search ..................................... 395/100, 101, 395/104, 112, 114, 115, 116, 163; 101/93.11, 93.12

[56] References Cited

U.S. PATENT DOCUMENTS

| | | | |
|---|---|---|---|
| 4,686,506 | 8/1987 | Farago | 341/100 |
| 4,839,793 | 6/1989 | Brunk | 395/275 |
| 4,954,968 | 9/1990 | Yamaguchi et al. | 395/112 |
| 5,146,544 | 9/1992 | Altham et al. | 395/114 |
| 5,233,167 | 8/1993 | Markman et al. | 235/375 |
| 5,330,370 | 7/1994 | Reddersen et al. | 439/502 |
| 5,347,113 | 9/1994 | Reddersen et al. | 235/462 |

Primary Examiner—Raymond J. Bayerl
Assistant Examiner—Tracy M. Legree
Attorney, Agent, or Firm—McAndrews, Held & Malloy, Ltd.

[57] ABSTRACT

A universal controller interface for use in a number of different barcode printers is disposed between the printer's microprocessor and a number of the printer's input and output devices including the printhead. The controller includes a microprocessor interface that allows the controller to be used with various types of printer microprocessors. The controller also includes a printhead control circuit that allows the controller to be used with various types of printheads such as an intelligent thermal printhead or a non-intelligent thermal printhead. The controller also includes a programmable serial input/output port and a programmable baud rate generator so as to further increase its flexibility and use with various types of barcode printer input and output devices. A memory protection circuit of the controller allows various portions of the printer's random access memory to be protected if desired.

27 Claims, 7 Drawing Sheets

FIG-5 INTELLIGENT PRINTHEAD HEATER CONTROL

FIG-6  NON-INTELLIGENT PRINTHEAD HEATER CONTROL

FIG-10

UART CLOCK PATTERNS GENERATED FOR EACH REF. FREQUENCY

UNIVERSAL CONTROLLER INTERFACE FOR BARCODE PRINTERS

TECHNICAL FIELD

The present invention is directed to a universal controller interface for use in a number of different barcode printers between the printer's processor and a number of the printer's input and output devices including the printhead and more particularly to such a controller interface that can communicate with different types of processors, different types of printheads and other printer peripherals of different types so that the same controller interface can be used in barcode printers having various capabilities

BACKGROUND OF THE INVENTION

Barcode printers are known to include interface circuitry between a microprocessor of the printer and the input and output devices of the printer that typically include a keyboard for data entry, a printhead for printing and a motor for advancing past the printhead a supply of the material to be printed on such as labels, tags, etc. This interface circuitry is typically designed for only one type of microprocessor, one type of printhead and other printer peripherals of a single type. Therefore, the interface circuitry for one barcode printer, generally, cannot be used in a barcode printer having one or more components of a different type. As a result, each time a new barcode printer is developed, new interface circuitry must also be developed increasing development time and costs.

SUMMARY OF THE INVENTION

In accordance with the present invention, the disadvantages of prior interface circuits for barcode printers as discussed above have been overcome. The controller interface of the present invention is universal in nature such that it may be used in a number of barcode printers having different components and capabilities so as to be very flexible and reduce the time and costs associated with developing new barcode printers.

More particularly, the controller of the present invention forms an interface between the printer's processor and a number of the printer's input and output devices including the printer's printhead. In accordance with one feature of the present invention, the controller includes a processor interface that allows the controller to communicate with a printer processor of a first configuration or a printer processor of a second configuration wherein these processors utilize different types of address and data buses as well as different control signals in order to communicate. To reduce the number of pins necessary for the controller to communicate with either one of these different processors, the processor interface of the controller includes at least one group of pins for communicating a first set of signals between the controller and a printer processor of the first type and the same group of pins is used to communicate a different set of signals between the controller and the printer's processor of the second type. For example, this group of pins may be used to connect the controller to a data bus associated with a processor of the first type; whereas the same group of pins may be used to connect the controller to a time multiplexed address and data bus associated with a processor of the second type. Similarly, one group of pins associated with the controller may be used only to output signals from the controller to a processor of one type; whereas that same group of pins may be used only to input signals to the controller from a processor of the other type.

In accordance with another feature of the present invention, the controller is provided with a printhead control interface that allows the controller to communicate with a number of different types of printheads each type of printhead requiring a different set of control signals. The printhead control interface generates a first set of printhead control signals on a number of output control lines for a thermal printhead of a first type and the printhead control interface generates a second set of printhead control signals on less than all of the same output control lines for a thermal printhead of a second type. Each printhead control signal of the first set may, for example, represent a different power level that is selectable by a thermal printhead of a first type; whereas the control signals of the second set may represent the power level selected by the printer's processor for a thermal printhead of the second type. Thus, the printhead control interface allows the controller of the present invention to be used with an intelligent printhead or a non-intelligent printhead for example. The printhead control interface may also include a counter that is responsive to the print data from the printer's processor for counting the number of print elements of the printhead to be turned on or energized per line of print. This counter provides the number of energized printhead elements per line of print to the processor for energy management, printhead monitoring and the like. Heretofore, the processor itself would keep track of the number of printhead elements to be energized for a given line of print utilizing a software counter. However, such software counters result in slower throughput of the data.

In accordance with still another feature of the present invention, the controller is provided with a serial input/output port that forms a programmable serial device data transmitter/receiver for shifting serial data out from the controller or for shifting serial data into the controller. The serial input/output port is programmable to determine the number of bits to be shifted; the data direction, i.e., whether the data is to be shifted in to or out from the port; and the shift direction i.e. whether the most significant bit or the least significant bit of the data is to be shifted first. Thus, the serial input/output port of the controller of the present invention can drive external serial devices of various types.

In accordance with a further feature of the present invention, the controller includes a baud rate generator that utilizes an asymmetric divider for generating each output clock pulse from a number of input clock pulses disposed in a predetermined pattern. The baud rate generator is programmable to accept input clock pulses at a number of different frequencies wherein each input frequency has an associated input clock pulse pattern for generating output clock pulses at a desired frequency. This feature allows output clock pulses to be generated at a desired frequency which is not an integer multiple of the minimum frequency of the clock input.

In accordance with another feature of the present invention, the controller includes a memory protection feature for the printer's RAM. More particularly, when an area of the printer's RAM stores at least one program according to which the printer's processor operates or other information to be protected, the present invention prevents a user from writing into that area of the RAM. The controller further includes means for disabling this memory protection feature to allow a new program or new information to be written into the previously protected area of the printer's RAM.

These and other objects, advantages and novel features of the present invention, as well as details of an illustrated embodiment thereof will be more fully understood from the following description and from the drawing.

DESCRIPTION OF THE PREFERRED EMBODIMENT

Figure 1:
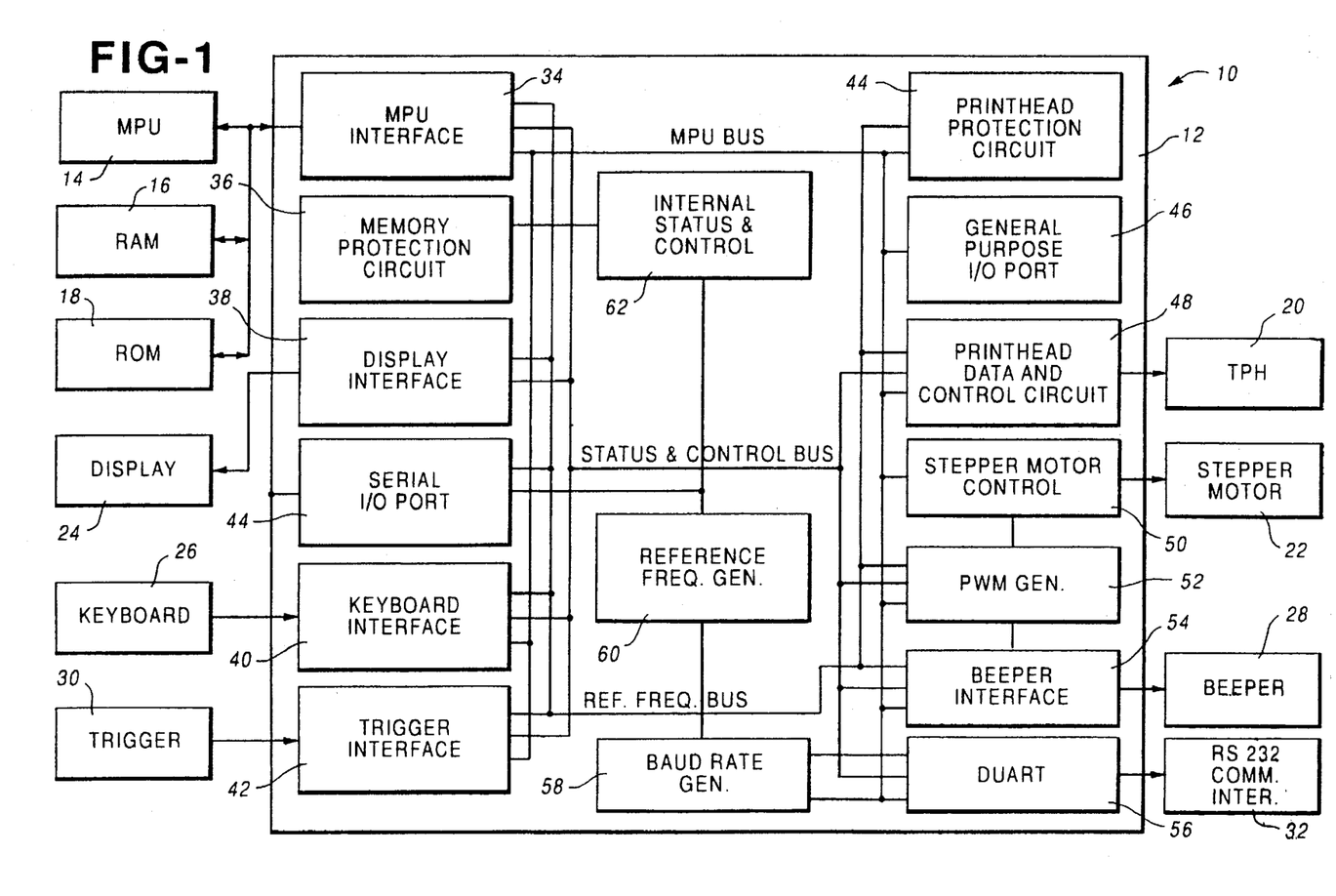
FIG. 1 is a block diagram of a barcode printer utilizing a controller in accordance with the preset invention.

A barcode printer 10 is shown in FIG. 1 having a controller 12 in accordance with the present invention. The controller 12 provides an interface between the printer's microprocessor 14, with associated RAM 16 and ROM 18, and a number of the printer's input and output devices such as a thermal printhead 20. The microprocessor 14 controls the thermal printhead 20 through the controller 12 to print on a web of record members such as labels, tags or the like. The web of record members forms a supply that is advanced through the printer 10 by a stepper motor 22 or a D.C. motor that is also controlled by the microprocessor 14. Although a printhead and motor for advancing the supply are necessary for various types of barcode printers, other of the input and output devices depicted in FIG. 1, such as the display 24, keyboard 26, beeper 28, etc., are not necessary and will vary in accordance with the type of printer in which the controller 12 is used. The controller 12 is thus designed for flexibility so that it can be used in a very sophisticated, high-cost printer having all or most of the depicted input and output devices as well as in a lower-cost printer having only a few of the input and output devices depicted. Because of this design, a low-cost printer having the controller 12 can be upgraded to provide additional functions without changing the basic architecture of the machine. For example, the controller 12 may be used in one barcode printer that prints data entered via a keyboard 26 in response to actuation by a user of a trigger key 30. The same controller 12 may also be used in a printer that does not include a keyboard 26 or a trigger 30 but that receives printing data from a host computer or the like via, for example, a RS 232 communication interface 32 coupled to the controller 12 wherein the data includes a print command for automatically controlling the barcode printer 10 to print.

As shown in FIG. 1, the controller 12 includes a microprocessor interface 34 that allows the controller 12 to communicate with at least two types of microprocessors so that the controller 12 can be used in a barcode printer 10 having any one of the supported microprocessors. A memory protection circuit 36 is provided so as to prevent a user from writing data into a protected area of the RAM 16. This feature is desirable in printers that allow software for controlling the operation of the microprocessor 14 to be downloaded into the RAM 16 of the printer via the communication interface 32 from a host computer. A display interface 38, keyboard interface 40 and trigger interface 42 are provided to respectively interface between the microprocessor 14 and the display 24, keyboard 26 and trigger 30. A serial input/output port 44 is programmable so as to allow a variable the number of serial bits to be shifted, variations in the data direction and variations in the shift direction. Thus, the serial input/output port 44 is extremely flexible and can be used with a large variety of external serial data devices. A printhead protection circuit 44 is included in the controller 12 to prevent the printhead from burning out by insuring that the printhead elements are not energized too long to cause damage thereto. A general purpose input/output port 46 is provided wherein each pin of this port is independently programmable as to whether it is an input or an output. A printhead data and control circuit 48 controls the transfer of print data to the thermal printhead 20 as well as controlling the heater lines that are coupled to the thermal printhead 20 to control the amount of heat generated when a printhead element is energized. The heater control portion of the circuit 48 allows the controller 12 to be used with an intelligent thermal printhead or a non-intelligent thermal printhead. As is well-known in the art, an intelligent thermal printhead itself controls the length of time that each printhead element is energized in accordance with the energization history of that particular printhead element as well as the energization history of the surrounding printhead elements by selecting a particular one of a number of timing pulses supplied thereto. This is opposed to a non-intelligent printhead that relies on the printer's microprocessor 14 to control the energization period of the printhead element. A stepper motor control 50 is responsive to the output of a pulse width modulation generator 52 to generate the drive signals for the stepper motor 22 of the barcode printer 10. The pulse width modulation generator 52 also generates signals for use by a beeper interface 54 that drives a beeper 28. A dual universal asynchronous receiver/transmitter (DUART) 56 is clocked by the output of a baud rate generator 58 so as to be able to communicate with the communication interface 32. The baud rate generator is programmable so as to accept input clock pulses at different frequencies from a reference frequency generator 60 wherein each input frequency has an associate clock pulse pattern for generating output clock pulses at a desired frequency. The baud rate generator 58 utilizes asymmetrical division to generate the desired frequency from the available reference frequency. Internal status and control registers 62 are utilized to provide status information and to generate various interrupts for the microprocessor 14.

Figure 2:
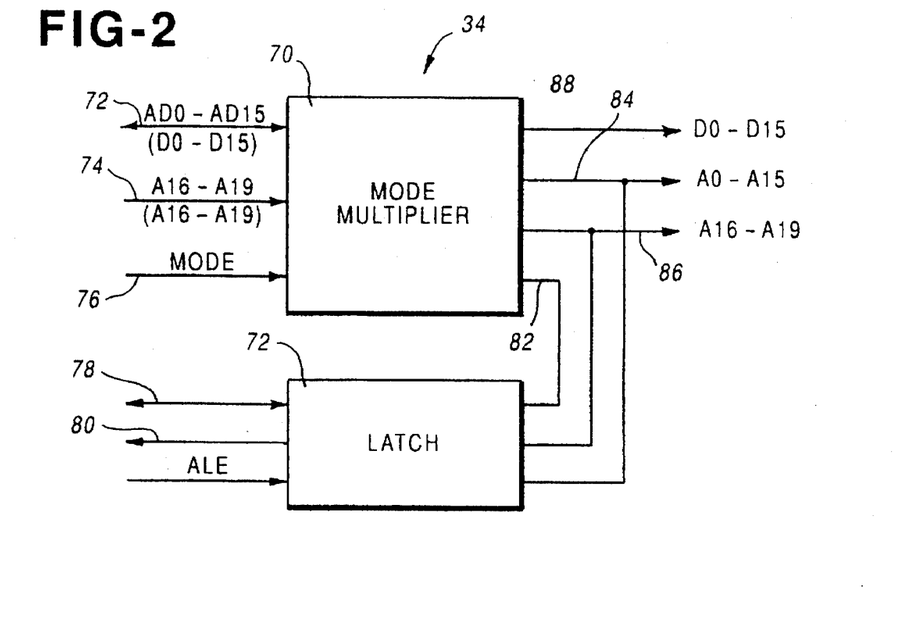
FIG. 2 is a block diagram illustrating the microprocessor interface circuit depicted in FIG 1.

The microprocessor interface 34 as shown in FIG. 2 allows the controller 12 to communicate with a microprocessor 14 of a first type or configuration such that the microprocessor communicates via an address bus and a separate data bus. An example of such a microprocessor is the Motorola MC68331 microprocessor hereinafter referred to as the '331 microprocessor. The interface 34 also allows the controller 12 to communicate with a microprocessor of a different type or configuration such as an Intel 80C186XL, hereinafter referred to as the '186 microporcessor, that utilizes a time multiplexed address-data bus. In order to minimize the number of pins necessary to communicate with these two diverse microprocessors, the microprocessor interface 34 includes groups of pins for communicating one set or type of signals between the controller 12 and one type of microprocessor; wherein the same group of pins is used to communicate a different set or type of signals between the controller 12 and a microprocessor of the other type.

More particularly, the microprocessor interface 34 includes a mode multiplexer 70 having a mode pin associated with line 76 for receiving information identifying the type of microprocessor 14 coupled to the controller 12. The multiplexer 70 also includes a number of pins associated with a bus 72 which forms in a '186 microprocessor mode a multiplexed address-data bus for the signals AD0–AD15. In the '331 microprocessor mode, the bus 72 associated with these same pins forms a data bus for inputting and outputting only data represented by the signals D0–D15. A number of pins associated with the multiplexer 70 are coupled to a bus 74 which carries address signals representing A16–A19 in both the '186 microprocessor mode and the '331 microprocessor mode.

The microprocessor interface 34 also includes a latch 72. In the '186 microprocessor mode a bus 78 forms an output bus connected to a group of pins of the latch 72 to provide the latched addresses A1L–A6L and A12L–A15L. However, in the '331 microprocessor mode the bus 78 forms an input bus coupled to the same pins of the latch 72 for providing addresses A1–A6 and A12–A15 that are input to the controller 12. A bus 80 is used to provide the latched addresses A0L, A7L–A11L and A16L–A19L that are output from the controller 12 in the '186 microprocessor mode only. Further, in the '186 microprocessor mode, the '186 microprocessor provides a latch enable signal, ALE that is coupled to the latch 72 to enable the addresses to be latched therein. The latch 72 is also responsive to a mode signal output from the multiplexer 70 on a line 82 to determine whether the latch is to accept information input on bus 78 or to output information on bus 78 and bus 80. In the input mode, the latch 72 transfers the above-described address information from the '331 microprocessor from bus 78 to a bus 84 for the internal use by the controller 12. In the output mode, the latch 72 latches the address information on bus 84 and a bus 86 to the output buses 78 and 80. It is noted that other pins of the microprocessor interface 34 may be used to carry different information between the controller 12 and the microprocessor 14 depending upon the mode. Further, the microprocessor interface 34 does include a number of pins dedicated solely to the use of only one type of microprocessor.

Figure 3:
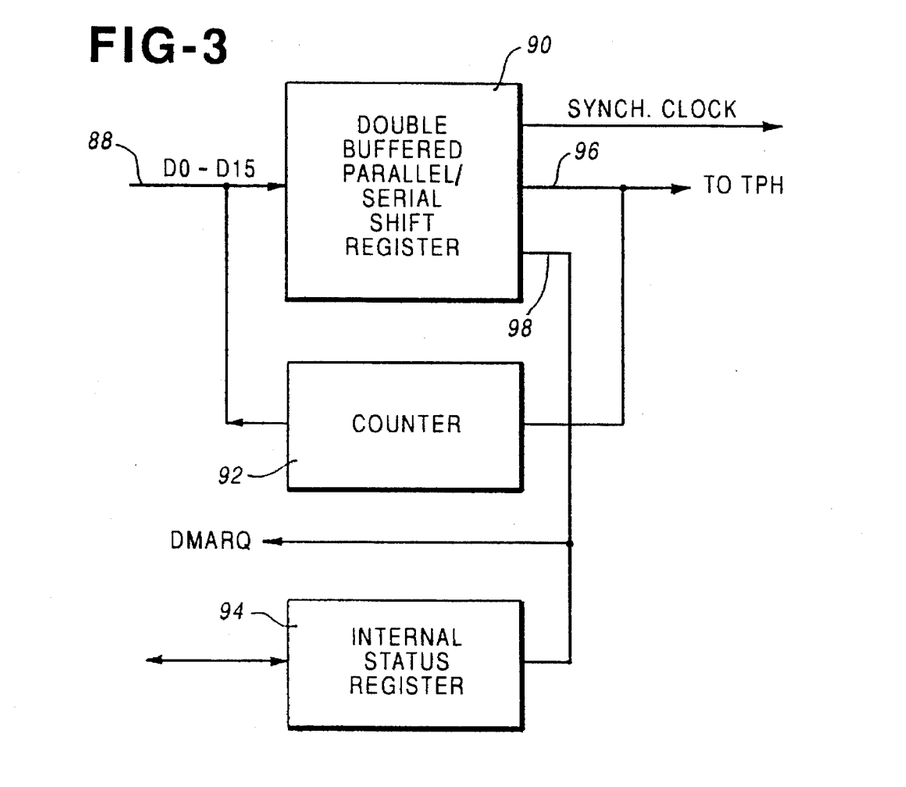
FIG. 3 is a block diagram illustrating a portion of the printhead data and control circuit depicted in FIG. 1.

The printhead data loading portion of the printhead control circuit 48 is depicted in FIG. 3. As shown therein, a double buffered parallel to serial shift register 90 includes a first buffer into which the parallel data on bus 88 is first shifted into and a second buffer into which the data from the first buffer is transferred in parallel, the data being serially shifted out from the second buffer and coupled to the thermal printhead 20 via a line 96. A counter 92 is coupled to the output of the shift register 90 so as to count the number of data bits representing thermal printhead elements to be energized to print a line of information. The data in the counter 92 is coupled back to the microprocessor 14 via the data bus 88 so that the microprocessor 14 can use the counter information for energy management and printhead monitoring functions. An output on line 98 from the double buffered shift register 90 represents the empty or full status of the first buffer so that when the status of the first buffer is empty, a direct memory access request is asserted so as to provide an interrupt for the microprocessor 14 indicating that the shift register 90 can accept data for the next line to be printed. The empty/full status line 98 is also coupled to an internal status register 94 for storage so that the microprocessor 14 can poll the status register 94 to determine the state of the first buffer of the double buffered shift register 90.

Figure 4:
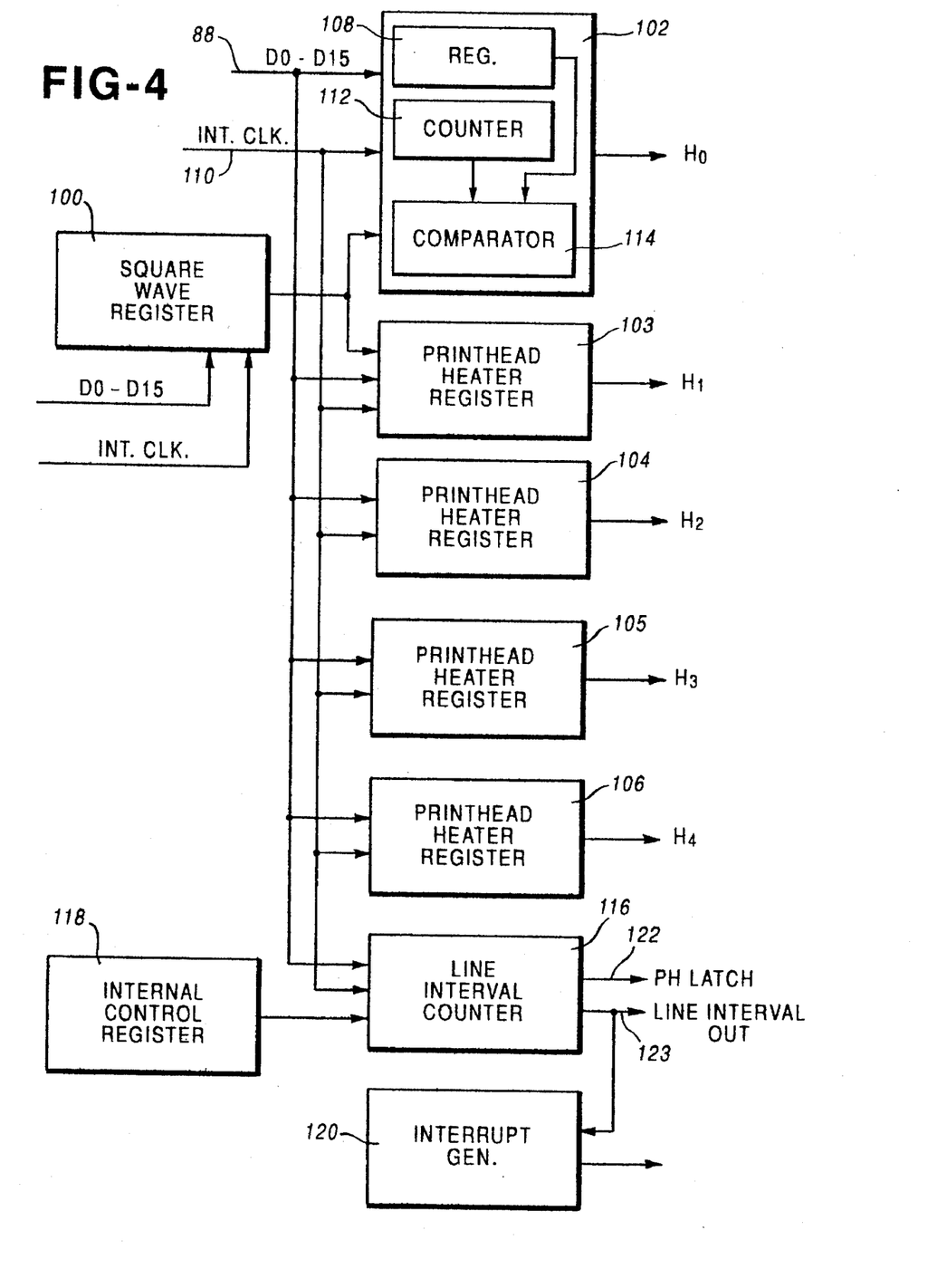
FIG. 4 is a block diagram illustrating a further portion of the printed head data and control circuit depicted in FIG. 1.

The printhead heater control portion of the circuit 48 of the controller 12 is depicted in FIG 4. As shown therein, a square wave register 100 is provided to determine whether the printhead logic will provide an output control for an intelligent thermal printhead or a non-intelligent thermal printhead. When the square wave register 100 is programmed with a zero value, the circuit provides the heat control outputs H0, H1, H2, H3 and H4 for an intelligent printhead from respective printhead heater registers 102–106. The heat control signals H0–H4 are each active low signals the length of which represents a selectable power level in the form of a selectable energization period for the elements of the thermal printhead 20 to control the amount of heat generated by a print element to print a dot. For example, the control signal H0 may be formed of an 800 microsec. active low signal; the control signal H1 may be formed of a 600 microsec. active low signal; the H2 control signal may be formed of a 500 microsec. active low signal; the H3 control signal may be formed of a 400 microsec. active low signal whereas the H4 control signal may be formed of a 200 microsec. active low signal.

Because each of the printhead heater registers 102–106 is of the same configuration, only the register 102 will be described in detail. As shown for the register 102, when operating in accordance with the intelligent printhead mode, a number representing the length of the active low period for the H0 control signal, i.e. 800 microsec. in the above example, is written from the data bus 88 into a register 108. A clock signal on a line 110 clocks a counter 112 to count during which time the output of the register 102 is low. The register output goes high when the value in the counter 112 is equal to the value stored in the register 108 as determined by a comparator 114. The registers 103–106 similarly generate the control signals H1–H4.

For non-intelligent thermal printhead control, the square wave register 100 is programmed with a non-zero value to control the period of a square wave output from the register 102 on the line associated with the control signal H0 and the period of the square wave's compliment output from the register 103 on the line associated with the control signal H1. This H0 control signal controls the amount of heat generated for one-half of the non-intelligent printhead whereas the Hi control signal controls the amount of heat generated for the other half of the non-intelligent printhead. Although the non-zero value in the register 100 represents the period of the square wave signals Ho and H1, the total length of the H0 and H1 signals is determined by the number, for example 800 microsec., stored in the register 10.

Figure 5:
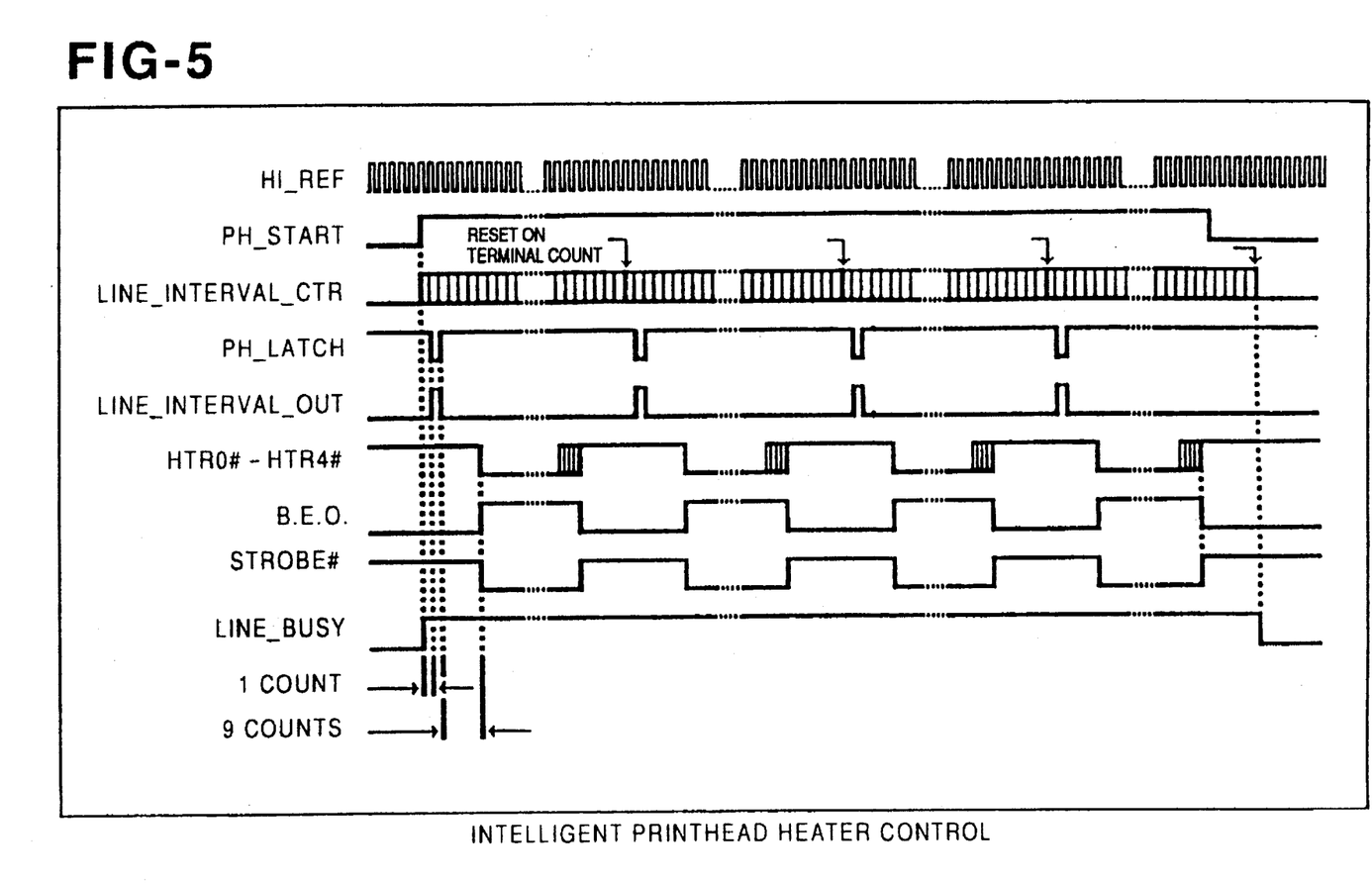
FIG. 5 is a timing diagram illustrating the control signals generated for heat control in an intelligent printhead.
Figure 6:
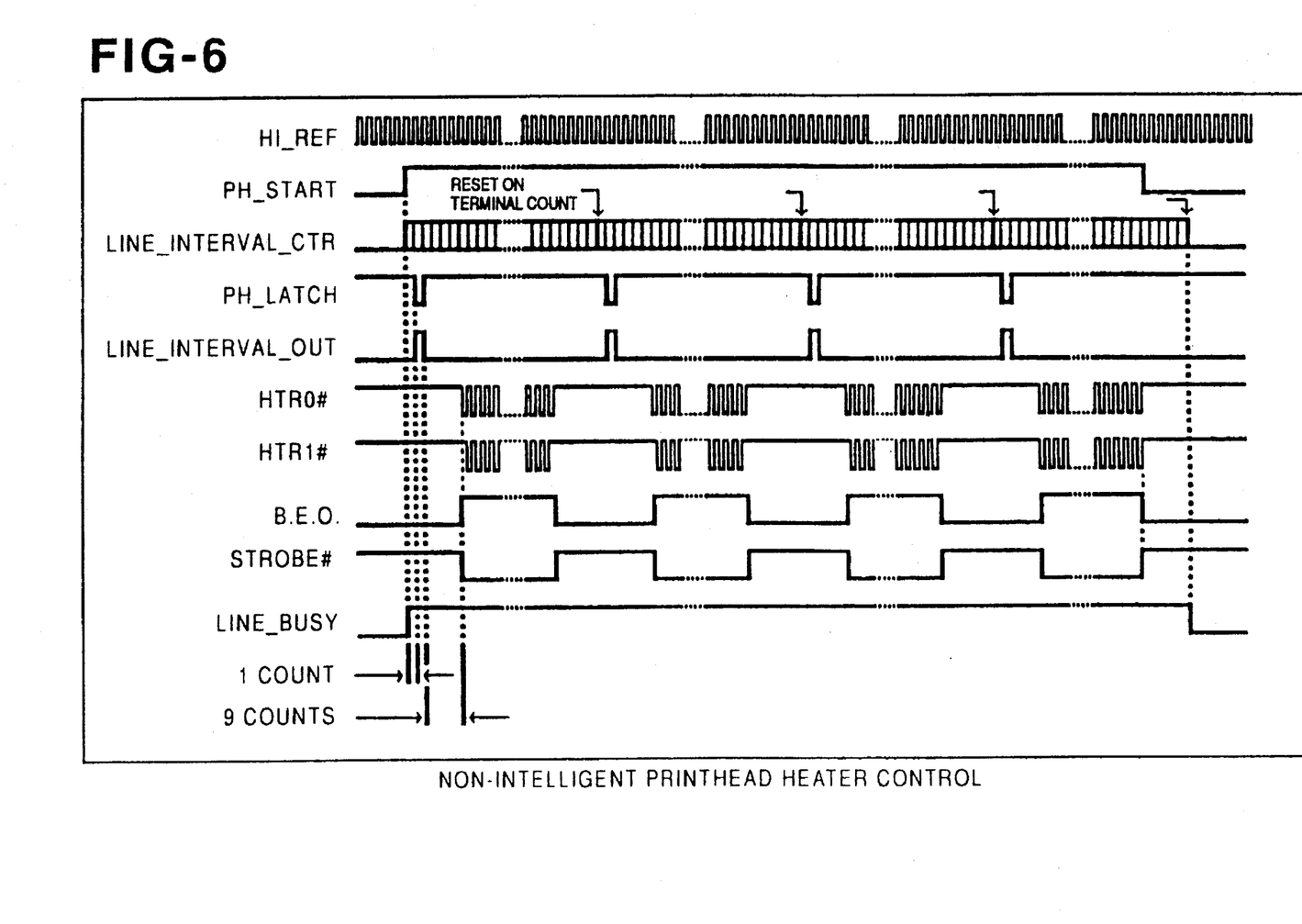
FIG. 6 is a timing diagram illustrating the control signals generated for heat control in a non-intelligent printhead.

A line interval counter 116 is loaded with a value representing the number of clocks signals to be used to synchronize the loading and heating of the printhead 20. The counter 116 generates a signal, PH LATCH, on a line 122 and a complimentary signal, LINE INTERVAL OUT, on a line 123 when a line interval counter equals a count of one. The PH LATCH signal is used to latch the print data to the thermal printhead 20; whereas the LINE INTERVAL OUT signal is used to indicate that the controller 12 is ready to process the data for the next line to be printed. It is noted that the LINE INTERVAL OUT signal on line 123 can be used directly or the signal can be applied to an interrupt generator 120 to generate an interrupt. An internal control register 118 is further provided to generate a printhead start signal that begins the synchronized printhead heating cycle. FIGS. 5 and 6 are timing diagrams illustrating the control signals H0–H4 generated for an intelligent printhead and the signals H0 and H1 generated for a non-intelligent printhead as described above as well as other printhead control signals.

Figure 7:
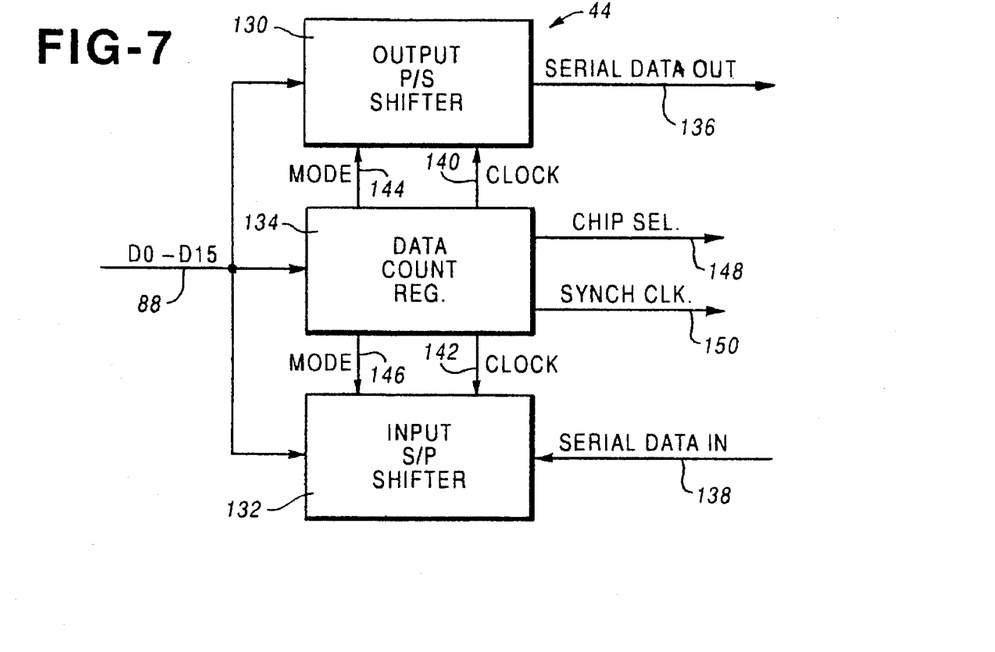
FIG. 7 is a block diagram illustrating the serial input/output port depicted in FIG 1.

The serial input/output port 44 of the controller 12 is shown in FIG. 7. The serial input/output port includes an output parallel to serial shifter 130 that receives data on the parallel data bus 88 to be shifted out serially on a line 136. The serial input/output port 44 also includes an input serial to parallel shifter 132 that receives serial data on a line 138 to be shifted in to the port 44 so as to be coupled to the parallel data bus 88. A data count register 134 controls the output shifter 130 and the input shifter 132 in response to data received from the bus 88, the data representing the number of bytes to be serially shifted; the data direction i.e. whether the data is to be shifted out from the port 44 or shifted into the port 44; and the shift direction i.e., whether the registers 130 and 132 respectfully shift from the most significant bit to the least significant bit or from the least significant bit to the most significant bit.

In response to the data received from the bus 88, the data count register 134 generates clock signals on line 140 if data is to be shifted out from the port 44 or it generates clock signals on a line 142 to the shifter 132 if data is to be shifted into the port 44. A mode signal on the respective lines 144 and 146 directs the respective shifter 130 or 132 to shift either the most significant bit first or the least significant bit first. The data count register also generates a chip select signal 148 in response to data being written to the data count register from the bus 88 and also generates a serial synchronization clock signal on a line 150. It is noted that the data count register 134 can be read to determine the status of a data transfer by the microprocessor polling the register to see of the count contained therein has expired indicating the completion of the data transfer.

Figure 8:
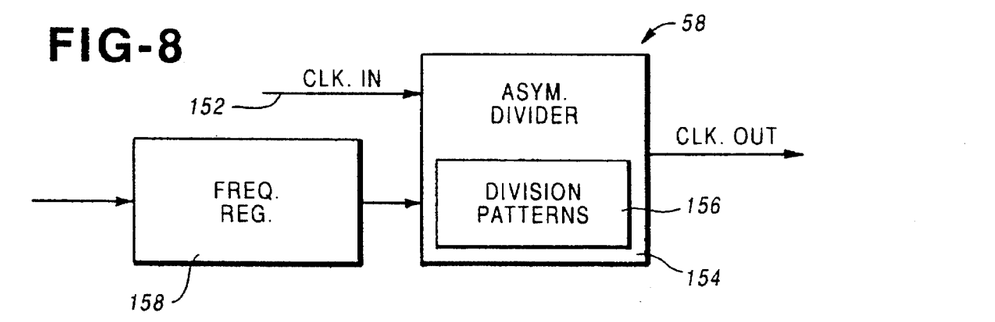
FIG. 8 is a block diagram illustrating the baud rate generator depicted in FIG 1.

The programmable baud rate generator 58 as shown in FIG. 8 generates various operating frequencies for the Duart 56 from an input clock signal received on line 152 from the reference frequency generator 60. The frequency that must be provided to the Duart 56 is 16 times the desired baud rate. Therefore, to support a baud rate of 19.2K, the minimum frequency that can be input to the Duart 56 is 16×19.2 KHz=307.2 KHz. All standard baud rates from 75 baud to 19.2K baud can be generated from 307.2 KHz utilizing the baud rate generator 58. Because the required 19.2K baud rate should be supported when the microprocessor 14 is operating at a low operating frequency which is approximately 524 KHz for one type of microprocessor and 500 KHz or 625 KHz for another type of microprocessor, neither microprocessor can provide clock signals that are integer multiples of 307.2 KHz at their lower operating frequencies. However, an approximately correct frequency can be generated by the programmable baud rate generator 58 by performing asymmetric division.

Figure 10:
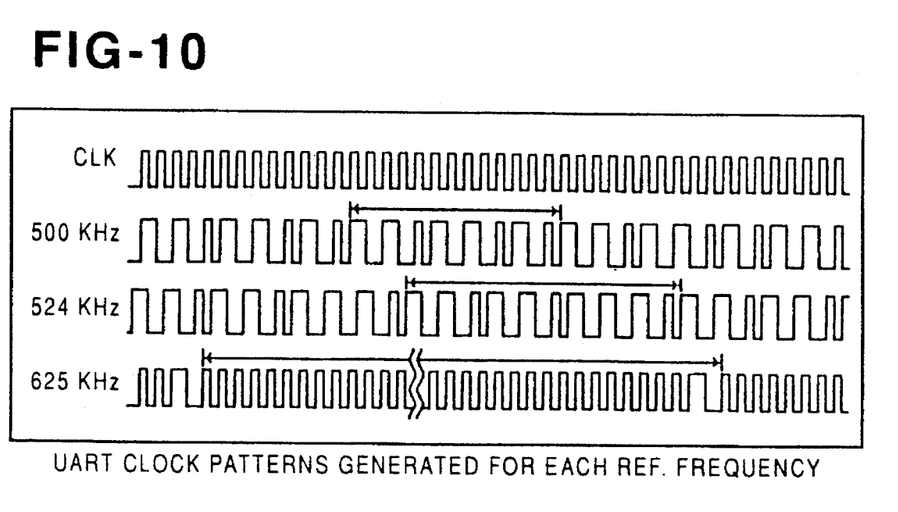
FIG. 10 is a timing diagram illustrating the operation of the baud rate generator depicted in FIG. 1.

An asymmetric divider 154 of the baud rate generator 58 performs the asymmetric division by forming each output clock pulse from a number of input clock pulses in a predetermined pattern. Each input frequency requires a different division pattern 156 to provide approximately the same basic output frequency. The asymmetric divider 154 is responsive to the input frequency, which is set in a frequency register 158 by the microprocessor 14, to select the appropriate clock divisors to generate the particular division pattern that is required to generate the output clock pulses of a desired frequency from the clock input pulses. For example, where the frequency of the input clock pulses on line 152 is 500 KHz, a 13:8 divisor circuit of the divider 154 produces a 307.69 KHz output clock signal (500 KHz÷13/8=307.69 KHz). The 13:8 division utilizes either one or two input clock cycles in the following pattern sequence: 2-2-1-2-2-1-2-1 repeating continuously over each 13 input clock cycles to produce one output clock cycle. For a 524 KHz input clock signal, a 17:10 divisor circuit is utilized to produce a 308.46 KHz clock which is within 0.34% of the desired 307.2 KHz rate. The 17:10 division uses either one or two input clock cycles in the following pattern: 2-2-1-2-2-1-2-2-1, repeating continuously over each 17 input clock cycles to produce one output clock cycle. For an input clock pulse frequency of 625 KHz, a 64:63 divisor circuit is used to produce a 615.23 KHz clock which is within 0.13% of an optimum 614.4 KHz rate. The 64:63 division utilizes a repeating pattern of 64 input clock pulses with each input clock pulse, except for the 64th clock pulse, producing an output clock pulse. Therefore, each group of 64 input clock pulses produces 63 output clock pulses. FIG. 10 illustrates the various clock patterns generated for reference frequencies of 500 KHz, 524 KHz and 625 KHz as discussed above.

Figure 9:
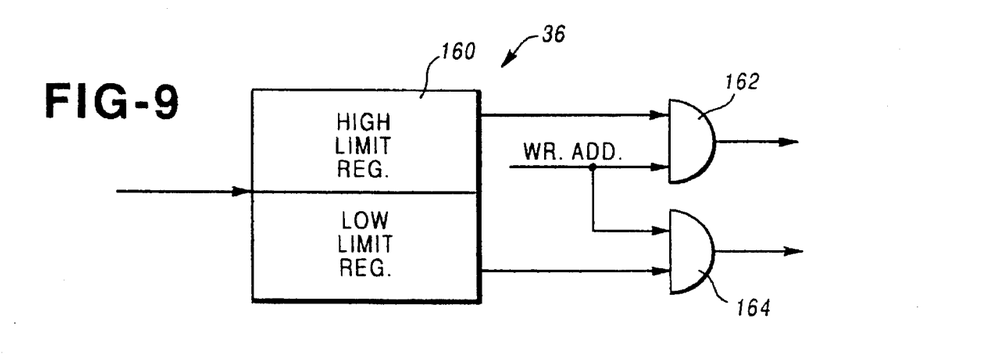
FIG 9 is a block diagram illustrating the memory protection circuit depicted in FIG 1.

The memory protection circuit shown in FIG. 9 allows an area of a memory, in particularly the RAM 16, to be protected so that information cannot be accidentally written over the information stored in the protected area. The memory protection circuit 36 includes a protection limits register 160 into which is written the high limit of the address range to be protected and the lower limit of the address range to be protected. The address of the RAM 16 that is being written to is compared to the high limit value and to the low limit value by respective comparators 162 and 164 to determine whether the write address is within the protected address range. If it is not, that address of the RAM 16 may be written to. However, if the write address is within the protected address range, the memory protection circuit 36 blocks the write signal so as to prevent the protected area of the RAM from being written to.

The memory protection circuit 36 may be disabled in order to allow a new program to be downloaded, for example from the communication interface 32 into the RAM 16. The memory protection circuit 36 is disabled by a password followed by simultaneous actuation of particular keys of the keyboard 26 with the keyboard interface controller 40 in a write protection disable mode. This sequence of events informs the microprocessor 14, through an internal status register 62, that the write protection has been disabled. Once the write protection has been disabled, the previously protected area of the RAM 16 can be written into. In order to again protect a new area of the RAM 16, new high limit and lower limit values are written into the register 160 after the next system reset.

The controller 12 is very flexible so that it can accommodate different types of printer microprocessors 14, different types of printheads 20, various types of serial input and output devices to be used in the printer 10 and various software storage schemes with the software being protected in the printer's memory. Thus, the controller 12 of the present invention can be used in various types of printers without change thereto so as to decrease the development time and costs associated with new barcode printers.

Many modifications and variations of the present invention are possible in light of the above teachings. Thus, it is to be understood that, within the scope of the appended claims, the invention may be practiced otherwise then as described hereinabove.

What is claimed and desired to be secured by Letters Patent is:

1. A controller interface for use in any one of a plurality of barcode printers between a processor of the printer and a number of the printer's input and output devices including a printhead, said controller comprising: a processor interface for allowing said controller to communicate with a printer processor of a first configuration or a printer processor of a second, different configuration, said processor interface including at least one group of pins for communicating via a first type of bus disposed between the controller and a printer processor of the first configuration and said same group of pins communicating via a different type of bus disposed between the controller and a printer processor of the second type.

2. A controller interface for use in any one of a plurality of barcode printers as recited in claim 1 wherein said first type of bus carries only data signals and said different type of bus carries time multiplexed address and data signals.

3. A controller interface for use in any one of a plurality of barcode printers as recited in claim 1 wherein said first type of bus carries only input address signals for said controller and said second type of bus carries only output address signals.

4. A controller interface for use in any one of a plurality of barcode printers as recited in claim 3 wherein said processor interface includes a latch for latching said output address signals.

5. A controller interface for use in any one of a plurality of barcode printers as recited in claim 1 wherein said processor interface includes at least one pin for identifying the type of printer processor in communication with said controller.

6. A controller interface for use in any one of a plurality of barcode printers as recited in claim 1 further including a printhead control interface for allowing said printer processor to communicate with a plurality of printheads each of said plurality of printheads requiring a different set of control signals.

7. A controller interface for use in any one of a plurality of barcode printers as recited in claim 1 further including a printhead control interface for allowing said controller to communicate with a thermal printhead of a first type or a thermal printhead of a different, second type, said printhead control interface generating a first set of printhead control signals on a plurality of output control lines for a thermal printhead of said first type and said printhead control interface generating a second set of printhead control signals on less than all of said output control lines for a thermal printhead of said second type.

8. A controller interface for use in any one of a plurality of barcode printers as recited in claim 7 wherein each printhead control signal of said first set represents a different power level that is selectable by a thermal printhead of said first type.

9. A controller interface for use in any one of a plurality of barcode printers as recited in claim 7 wherein the control signals of said second set represent a power level that said printer processor determines is to be used by the thermal printhead of the second type.

10. A controller interface for use in any one of a plurality of barcode printers as recited in claim 7 wherein each of said first and second types of printheads includes a plurality of printhead elements, said printer processor couples print data through said controller to said printhead, said print data representing the print elements of the printhead to be turned on to print and said controller further includes a counter responsive to said print data from said processor for counting the number of said print elements to be turned on, said counter providing information representing said number to said processor.

11. A controller interface for use in any one of a plurality of barcode printers as recited in claim 1 further including a serial input/output port for shifting serial data out from said controller or for shifting serial data into said controller, said data including a most significant bit and a least significant bit; and said serial input/output port being programmable to determine whether data is to be shifted in or to be shifted out and to determine whether the most significant bit or said least significant bit is to be shifted first.

12. A controller interface for use in any one of a plurality of barcode printers as recited in claim 11 wherein said serial input/output port includes a serial output data register, a serial input data register and a register for storing data representing the number of serial data bits to be shifted, whether the data is to be shifted in or shifted out and whether the most significant bit or least significant bit is to be shifted first.

13. A controller interface for use in any one of a plurality of barcode printers as recited in claim 1 including a baud rate generator for generating each output clock pulse from a plurality input clock pulses in a predetermined pattern, said baud rate generator being programmable to accept input clock pulses at a plurality of different frequencies, each input frequency having a different, associated clock pulse pattern for generating output clock pulses at a desired frequency.

14. A controller interface for use in any one of a plurality of barcode printers as recited in claim 1 wherein said processor operates in accordance with at least one program stored in a memory that can be written to and read from and said controller further including memory protection means for preventing a user from writing into the area of said memory storing said program.

15. A controller interface for use in any one of a plurality of barcode printers as recited in claim 14 further including means for disabling said memory protection means to allow a new program to be written into said area of said memory.

16. A controller interface for use in any one of a plurality of barcode printers as recited in claim 14 wherein said memory protection means includes a programmable register for storing information representing a range of addresses in said memory defining the area of said memory to be protected and means for comparing a write address defining a location of said memory to be written to with said stored range of addresses, said comparing means preventing information from being written at said location in said memory if said write address is within said range of addresses.

17. A controller interface for use in any one of a plurality of barcode printers between a processor of the printer and a number of the printer's input and output devices including a printhead, said controller comprising: a printhead control interface for allowing said controller to communicate with a thermal printhead of a first type or a thermal printhead of a different, second type, said printhead control interface generating a first set of printhead control signals on a plurality of output control lines for a thermal printhead of said first type and said printhead control interface generating a second set of printhead control signals on less than all of said output control lines for a thermal printhead of said second type.

18. A controller interface for use in any one of a plurality of barcode printers as recited in claim 17 wherein each printhead control signal of said first set represents a different power level that is selectable by a thermal printhead of said first type.

19. A controller interface for use in any one of a plurality of barcode printers as recited in claim 17 wherein the control signals of said second set represent a power level that said printer processor determines is to be used by the thermal printhead of the second type.

20. A controller interface for use in any one of a plurality of barcode printers as recited in claim 17 wherein each of said first and second types of printheads includes a plurality a printhead elements, said printer processor couples print data through said controller to said printhead, said print data representing the print elements of the printhead to be turned on to print and said controller further includes a counter responsive to said print data from said processor for counting the number of said print elements to be turned on, said counter providing information representing said number to said processor.

21. A controller interface for use in any one of a plurality of barcode printers between a processor of the printer and a number of the printer's input and output devices including a printhead, said controller comprising: a serial input/output port for shifting serial data out from said controller or for shifting serial data into said controller, said data including a most significant bit and a least significant bit; and said serial input/output port being programmable to determine the number of bits to be shifted, whether data is to be shifted in or to be shifted out and to determine whether said most significant bit or said least significant bit is to be shifted first.

22. A controller interface for use in any one of a plurality of barcode printers as recited in claim 21 wherein said serial input/output port includes a serial output data register, a serial input data register and a register for storing data representing the number of serial data bits to be shifted, whether the data is to be shifted in or shifted out and whether the most significant bit or least significant bit is to be shifted first.

23. A controller interface for use in any one of a plurality barcode printers between a processor of the printer and a number of the printer's input and output devices including a printhead, said controller comprising: a baud rate generator for generating each output clock pulse from a plurality of input clock pulses in a predetermined pattern, said baud rate generator being programmable to accept input clock pulses at a plurality of different frequencies, each input frequency having a different associated clock pulse pattern for generating output clock pulses at a desired frequency.

24. A controller interface for use in any one of a plurality of barcode printers as recited in claim 23 wherein said baud rate generator includes an asymmetric divider for storing a plurality of divisor ratios each representing a different one of said predetermined patterns, said divider being responsive to the identity of the frequency of the input clock pulses for selecting one of said divisor ratios for generating a output clock pulses at a desired frequency for input clock pulses in the predetermined pattern represented by the selected divisor ratio.

25. A controller interface for use in any one of a plurality of barcode printers as recited in claim 23 wherein said baud rate generator is responsive to input clock pulses of a first frequency for generating output clock pulses of a predetermined output frequency with said input clock pulses in a first pattern and said baud rate generator being responsive to input clock pulses of a second frequency for generating output clock pulses of approximately the same predetermined output frequency with said input clock pulses of said second frequency in a different pattern.

26. A controller interface for use in any one of a plurality of barcode printers between a processor of the printer and a number of the printer's input and output devices including a printhead, said printer's processor having an associated memory that can be written to and read from and said controller comprising: memory protection means for preventing a user from writing into an area of said memory to be protected wherein said memory protection means includes a programmable register for storing information representing a range of addresses in said memory defining the area of said memory to be protected and means for comparing a write address defining a location of said memory to be written to with said stored range of addresses, said comparing means preventing information from being written to said location in said memory if said write address is within said range of addresses represented by information stored in said programmable register.

27. A controller interface for use in any one of a plurality of barcode printers as recited in claim 26 further including means for disabling said memory protection means to allow new information to be written into a previously protected area of said memory.

* * * * *